United States Patent [19]

Brgelz

[11] 3,921,105

[45] Nov. 18, 1975

[54] VARIABLE ATTENUATION EQUALIZER

[75] Inventor: Franc Brgelz, Kanata, Canada

[73] Assignee: Northern Electric Company Limited, Montreal, Canada

[22] Filed: June 24, 1974

[21] Appl. No.: 481,963

[52] U.S. Cl................. 333/28 R; 307/237; 307/264; 328/168; 330/107; 333/80 R

[51] Int. Cl.[2]........................................... H03H 7/14

[58] Field of Search............ 307/237, 264; 328/208, 328/168; 330/107, 109; 333/28 R, 80 T, 80 R

[56] References Cited

UNITED STATES PATENTS

| | | | |
|---|---|---|---|
| 3,446,996 | 5/1969 | Toffler | 333/28 R X |
| 3,753,140 | 8/1973 | Feistel | 330/109 |
| 3,800,265 | 3/1974 | Yoshioka et al. | 333/28 R |

*Primary Examiner*—Paul L. Gensler
*Attorney, Agent, or Firm*—John E. Mowle

[57] ABSTRACT

An attenuation equalizer which includes various network structures that require only a single complex immittance, (i.e. an RC network) and a single variable impedance element (i.e. a variable resistance) to provide variable magnitude equalization.

9 Claims, 16 Drawing Figures

VARIABLE ATTENUATION EQUALIZER

This invention relates to an attenuation equalizer and more particularly to one which can provide variable magnitude equalization with network structures utilizing a single complex immittance (impedance or admittance) and a single variable impedance element.

BACKGROUND OF THE INVENTION

Variable attenuation equalizers are used throughout many transmission systems and particularly in long distance telephone circuits to compensate for the ambient operating conditions of the system. An example would be to compensate for the loss of a coaxial cable which can be considered to have a fixed loss at a specific length, and a variable loss that is affected by a change in length and other variable parameters such as temperature and humidity. In general, such compensation is achieved in two stages; the first utilizing a fixed equalizer having a frequency response which is inversely proportional to the fixed loss at one cable length, and the second utilizing the variable equalizer which continuously compensates for the varying parameters by adding or subtracting some fraction of the gain of a predetermined attenuation characteristic. It is this latter circuit to which the present invention is directed. U.S. Pat. No. 2,096,027 by Hendrik W. Bode, issued Oct. 19, 1937, describes an adjustable attenuation equalizer which is the basis for many such circuits in use today. Realization of the Bode-type equalizer can take many circuit configurations all based on the following relationship:

$$\frac{Z_{2\infty}}{Z_{20}} = \frac{Z_0^2}{Z_1^2} \qquad (1)$$

where:

- $Z_{2\infty}$ and $Z_{20}$ are the open-circuited and short-circuited impedances respectively,
- $Z_0$ is the reference value of an adjustable impedance, and
- $Z_1$ is the impedance of the network measured across the adjustable impedance.

The principal disadvantage of variable equalizer realizations that are based on equation (1) is the need for dual impedances in virtually all applications thus making the use of inductors mandatory. Inductors are particularly disadvantageous when the networks are fabricated in thick or thin film.

A realizable transfer function that satisfies the property of equation (1) has the following form:

$$T_1(s) = \frac{1 + x\,H_1(s)}{xs + H_1(s)} \qquad (2)$$

or, to the first order: $l\,\eta T_1(\omega) \approx [(X-1)/(x+1)]\, l\eta H_1(\omega) + \ldots$ where:

- $x = R/R_o$, $O \leqq R \leqq \infty$ (could be $X_c$ or $X_L$ as well)
- $R$ = a variable resistance
- $R_o$ = a reference resistance, and
- $H_1(s)$ = the normalized driving point impedance facing the variable resistance $R$.

STATEMENT OF THE INVENTION

The present invention is based on a novel interpretation of a modified from of equation (2), namely, substituting:

$$x = (1+y)/(1-y)$$
$$H_1(s) = [1 - H(s)]/[+ H(s)]$$

into equation (2) yields the following transfer function:

$$T(s) = \frac{1 - yH(s)}{1 + yH(s)} \qquad (3)$$

or to the first order: $l\,\eta T(\omega) \approx \{[1 - H(\omega)]/[1 + H(\omega)]\} + \ldots$ It should be noted that the convergence properties of the series expansions of equations (2) and (3) are identical.

The general form of the transfer function in equation (3) is known with respect to the design for Bode-type equalizers where $y$ would signify the reflection coefficient of the variable element multiplied by a constant, and H($s$) would be the square of the shaping transfer function. The crux of this invention is identifying $y$ in (3) not as a reflection coefficient but a normalized variable element itself, and H($s$) in (3) not as a shaping transfer function but a shaping immittance. Hence with regard to equation (3), as contemplated in the present invention:

$$y = R/R_o = G/G_o = C/C_o = L/L_o = Z_r(s)/Z_o(s) = Y_r(s)/Y_o(s) \text{ and} \qquad (4)$$
$$H(s) = \text{normalized immittance}$$

where:

- $R$, $G$, $C$, $L$, $Z_r(s)$, $Y_r(s)$ denote variable resistance, conductance, capacitance, inductance, variable complex impedance and variable complex admittance respectively,
- $R_o$, $G_o$, $C_o$, $L_o$, $Z_o(s)$, $Y_o(s)$ denote the reference resistance, conductance, capacitance, inductance, reference complex impedance and reference complex admittance respectively.

In order for the series expansion of equation (2) or (3) to converge (and hence provide for the prescribed variable equalization) the following conditions must be satisfied:

$$|y| \leqq 1 \qquad |H(\omega)| \leqq 1 \qquad (5)$$

The restrictions in (5) limit the range of variable elements as follows:

$$\begin{array}{ll} -R_o \leqq R \leqq R_o & -L_o \leqq L \leqq L_o \\ -G_o \leqq G \leqq G_o & -Z_o(s) \leqq Z_r(s) \leqq Z_o(s) \\ -C_o \leqq C \leqq C_o & -Y_o(s) \leqq Y_r(s) \leqq Y_o(s) \end{array} \qquad (6)$$

The restrictions in (5) also give rise to a particular form of immittance H($s$) that will be shown as readily realizable, namely:

$$H(s) = \begin{cases} \dfrac{R_o}{R_o + Z(s)} = \dfrac{1}{1 + Z(s)/R_o} \\[2ex] \dfrac{G_o}{G_o + Y(s)} = \dfrac{1}{1 + Y(s)/G_o} \\[2ex] \dfrac{sC_o}{sC_o + Y(s)} = \dfrac{1}{1 + Y(s)/sC_o} \\[2ex] \dfrac{sL_o}{sL_o + Z(s)} = \dfrac{1}{1 + Z(s)/sL_o} \\[2ex] \dfrac{Z_o(s)}{Z_o(s) + Z(s)} = \dfrac{1}{1 + Z(s)/Z_o(s)} \\[2ex] \dfrac{Z_o(s)}{Y_o(s) + Y(s)} = \dfrac{1}{1 + Y(s)/Y_o(s)} \end{cases} \qquad (7)$$

where $Z(s)$ and $Y(s)$ denote the driving-point impedance or admittance respectively which is in series or in parallel with its respective reference component.

It should be noted that in view of equations (4), (6) and (7), the variable equalizer transfer function in (3) is fully described in terms of a single variable component and a single immittance. Nowhere was it necessary to invoke the relationship in equation (1) which is a basis for Bode-type equalizers nor is this relationship valid for the structures disclosed herein.

BRIEF DESCRIPTION OF THE DRAWINGS

Example embodiments of the invention will now be described with reference to the accompanying drawings in which.

DESCRIPTION OF THE PREFERRED EMBODIMENTS

Figure 1:
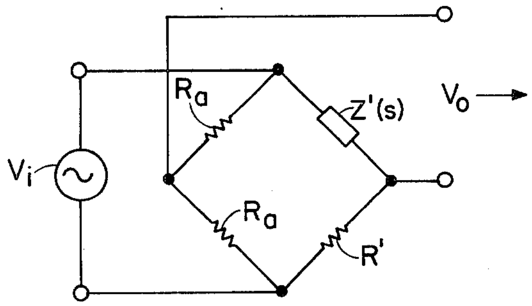
Fig. 1 PRIOR ART
FIG. 1 is a schematic diagram of a generally known form of lattice network that serves as a basis for several new variable attenuation equalizer structures.

FIG. 1 illustrates a typical known form of lattice network structure which includes a pair of equal resistances $R_a$, a resistive element $R'$ and a frequency variable impedance $Z'(s)$. One pair of opposite corners of the bridge is connected from input terminals to an a-c source of voltage $V_i$ while the other corners of the bridge have output terminals for connecting the output voltage $V_o$ therefrom. The transfer function for this bridge network is given by:

$$T'(s) = [1 - R'/Z'(s)]/[1 + R'/Z'(s)] \quad (8)$$

The inventive aspect is based on the realization that this basic bridge configuration will function as a variable attenuation equalizer if the following conditions are met:

$$R' = R \qquad Z'(s) = R_o + Z(s)$$

where:

$R$ is a variable element, $-R_o \leqq R \leqq R_o$ $Z(s)$ = a complex frequency variable immittance.

Such a substitution results in the variable equalizer transfer function of equation (3) subject to the appropriate conditions of equations (4), (6) and (7) which depend upon the type of impedance elements (either resistive, capacitive or inductive) which are utilized.

Figure 2:
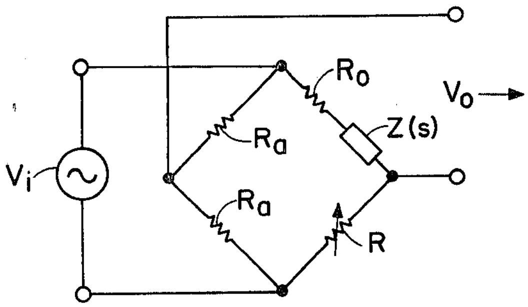
FIGS. 2 to 7 are schematic diagrams of variable attenuation equalizers using either variable resistance, conductance, capacitance, impedance or admittance.
Figure 3:
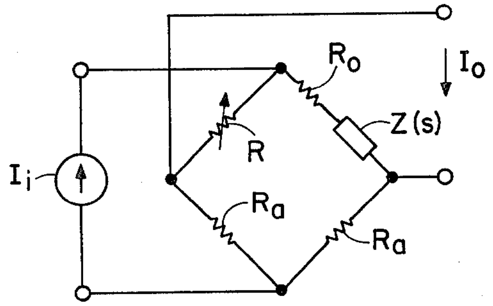
Figure 4:
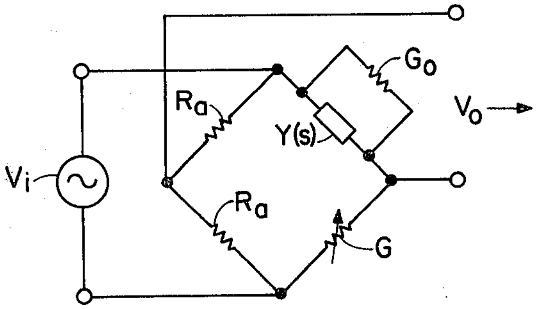
Figure 6:
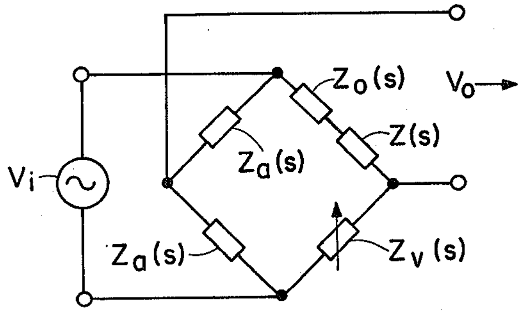
Figure 7:
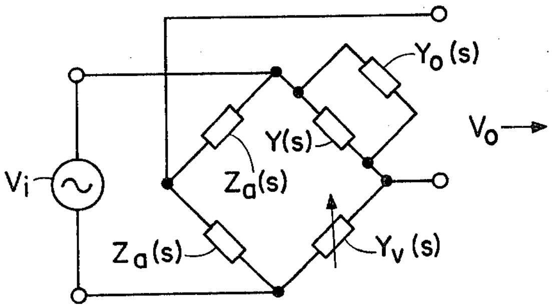

FIG. 2 illustrates one form of the bridge type variable attenuation equalizer which is driven from a voltage source $V_i$ to derive a voltage output $V_o$. It utilizes a variable resistance R, a reference resistance $R_o$ and a complex frequency variable impedance $Z(s)$, the structure of which depends upon the required attenuation characteristics as discussed below with respect to FIG. 14 and 15. FIG. 3 illustrates the dual of FIG. 2 and is driven from a current source $I_i$ to derive an output current $I_o$. In FIG. 4, conductances G and $G_o$ are substituted for resistances R and $R_o$ respectively while an admittance $Y(s)$ is substituted for the impedance $Z(s)$ of FIG. 2, and the structure altered accordingly so as to function in accordance with the transfer function of equation (3) when subject to the appropriate conditions of equations (4), (6) and (7). Similarly in FIG. 5, the capacitances C and $C_o$ are substituted for the conductances G and $G_o$ of FIG. 4 respectively so as to again provide a variable attenuation equalizer which functions in accordance with the transfer function of equation (3). The embodiments of FIGS. 6 and 7 illustrate the more general case of the variable attenuation equalizers illustrated in FIGS. 2 through 5. In FIG. 6, equal impedances $Z_a(s)$ are used in two arms of the bridge, the variable element is an impedance $Z_v(s)$ connected in a third arm, while the reference impedance $Z_o(s)$ is connected in series with a complex frequency variable impedance $Z(s)$ in the fourth arm. In FIG. 7, the variable admittance $Y_v(s)$ replaces the impedance $Z_v(s)$, the reference admittance $Y_o(s)$ replaces the reference impedance $Z_o(s)$ while the admittance $Y(s)$ replaces the impedance $Z(s)$. Again, both circuits will function as variable attenuation equalizers in accordance with the transfer function of equation (3) subject to the restrictions of equations (4), (6) and (7). Similarly, alternate structures can be derived for variable inductances L (not shown) to meet the variable equalizer transfer function of equation (3) when subject to the appropriate conditions introduced in equations (4), (6) and (7). It is important to note however that none of the above structures satisfy the fundamental equation (1) of all Bode-type equalizers.

The network structures in FIGS. 2 to 7 have one significant advantage over the usual Bode-type equalizer realizations and a minor disadvantage. The realizations in FIGS. 2 to 7 require only a single shaping immittance $Z(s)$ or $Y(s)$, contrary to the Bode-type equalizer realizations that require dual immittances. Hence, the structures in FIGS. 2 to 7 could realize a monotonic loss response such as that of a coaxial cable of variable length by means of lumped or distributed RC immittances alone, while the Bode-type equalizers would require both RC and RL immittances for the same response.

However, in the Bode-type equalizer the variable element varies from 0 to ∞ and the variable characteristic changes sign (see power expansion of equation (2)) when the variable element passes through its non-zero reference value. In order to attain the variable attenuation range of the Bode-type variable equalizer with the structures shown in FIGS. 2 to 5, the variable element must vary from a negative to positive reference value, as shown in equation (6). In many practical circuits it is difficult to realize negative elements, hence by restricting the variable element to positive values only, the variable range of the equalizers in FIGS. 2 to 5 will be one-half those of the Bode-type equalizer. The price in the reduced equalizer range is small when compared to the technological advantages with the new structures that do not require dual impedances, and consequently eliminate inductors in many applications.

Figure 8:
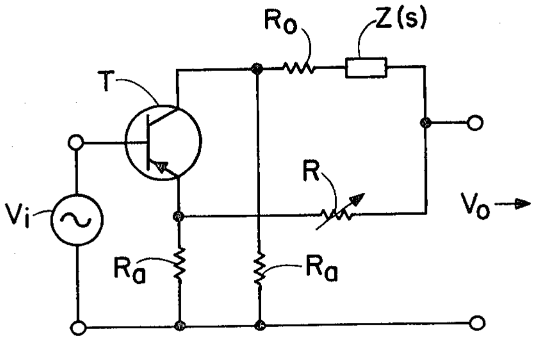
FIGS. 8 and 9 are unbalanced active realizations (utilizing a single transistor) of the attenuation equalizers illustrated in FIGS. 2 and 5.
Figure 9:
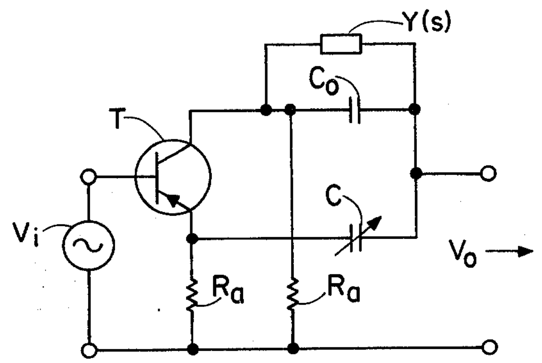
Figure 10:
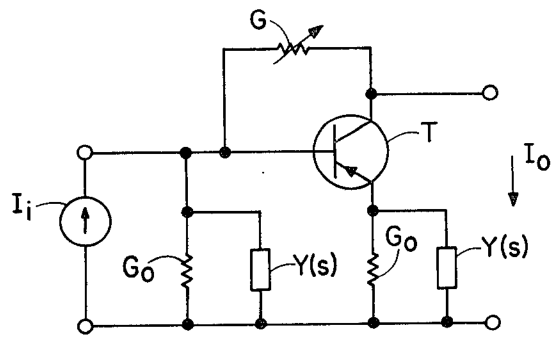
FIG. 10 is a single transistor non-lattice type structure of a variable attenuation equalizer, using two identical shaping immittances.

The passive equalizer structures in FIGS. 2 to 5 are all balanced and hence not always practical to implement. This problem can be overcome by introducing an active element such as a transistor T as illustrated in FIGS. 8, 9 and 10. Structurally, the networks of FIGS. 8 and 9 provide active unbalanced realizations of the passive balanced equalizers illustrated in FIGS. 2 and 5 respectively. Not all realizations of the fundamental equation (3) need to rely on lattice-like network structures. The single transistor structure illustrated in FIG. 10 makes use of two identical shaping immittances Y($s$); the benefits of this particular structure may be in relatively low impedance levels which is of advantage at high frequencies. Again, all structures satisfy the basic transfer function of equation (3) utilizing the appropriate portions of equations (4), (6) and (7).

Figures 11, 12, 13, 15:
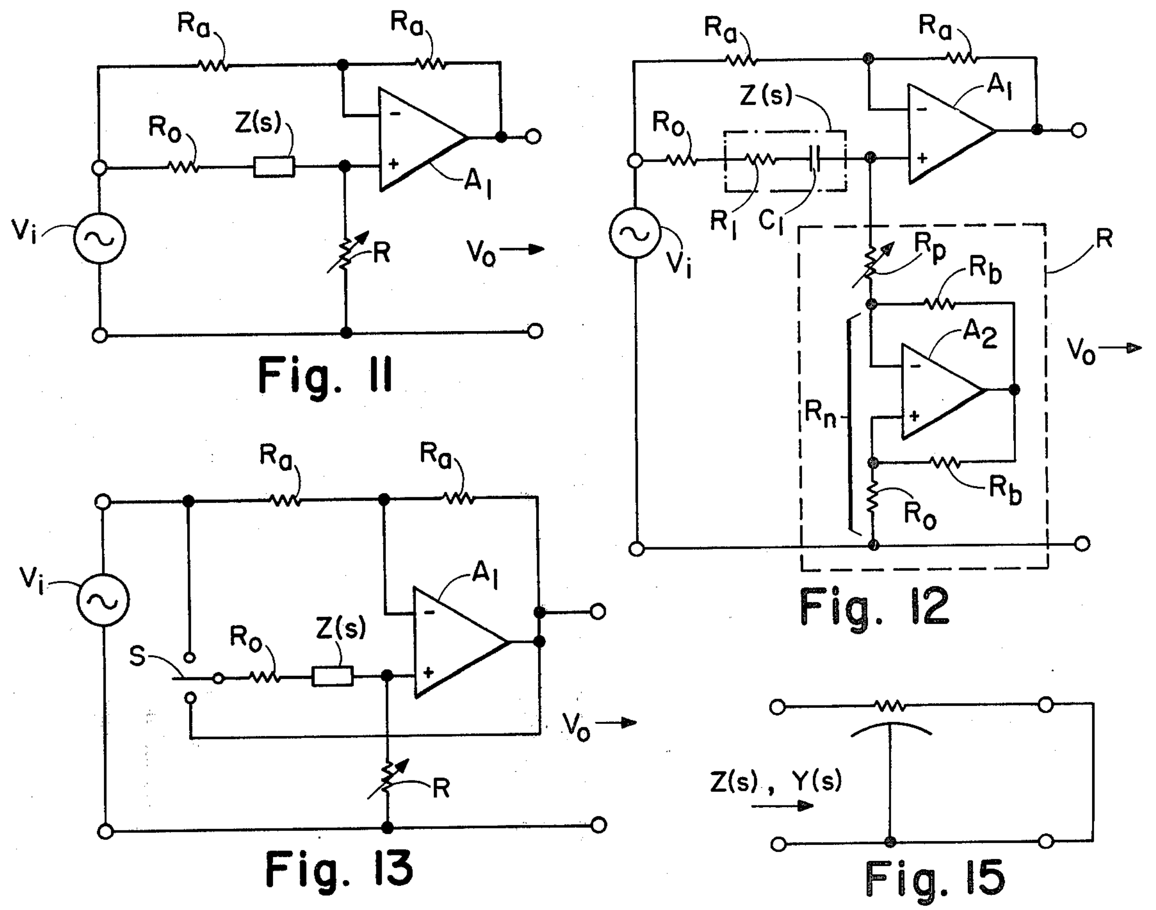
FIG. 11 is an unbalanced realization (utilizing a single operational amplifier) of the attenuation equalizer illustrated in FIG. 2.
FIG. 12 is an unbalanced variation of FIG. 11, with double the variable range obtained by utilizing a negative resistance.
FIG. 13 is an unbalanced variation of FIG. 11, in which the range is extended by switching a portion of the circuit.
FIGS. 14 and 15 illustrate a typical distributed and lumped immittance respectively that may be utilized in any of the embodiments illustrated in FIGS. 2 to 13.

FIG. 11 illustrates an unbalanced variable attenuation equalizer utilizing an operational amplifier $A_1$, the balance of the components corresponding to those illustrated in FIG. 2. Utilizing a positive variable resistance R, all the equalizer networks described above are limited to half the range of the Bode-type equalizers. However, the full range can be covered by connecting a fixed negative resistance $R_n = -R_o$ in series with a positive resistance $R_p$ which is variable from 0 to $+2R_o$ so that the effective variable resistance can be varied between $-R_o$ and $+R_o$. FIG. 12 is an extension of the circuit illustrated in FIG. 11 which incorporates this concept. The negative resistance $R_n$ comrises an operational amplifier $A_2$ in conjunction with a pair of feedback resistors $R_b$ and a reference resistance $R_o$ which co-act to produce a negative resistance $R_n = -R_o$. Since the variable resistance $R = R_p + R_n$, if $0 \leqq R_p \leqq 2R_o$ then the variable resistance R will meet the full range as defined in equation (6).

The embodiment illustrated in FIG. 13 is also based on FIG. 11 and makes use of a single operational amplifier $A_1$ and a single-pole double-throw switch S to cover the same variable attenuation range as the network illustrated in FIG. 12. When the switch S is in its upper position the circuit covers the range $0 \leqq R \leqq R_o$. With the switch S in its lower position, varying the resistance R will cover the range between $-R_o \leqq R \leqq 0$.

Figure 14:
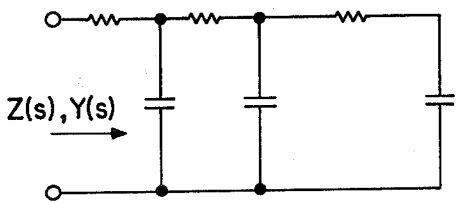
Figure 16:
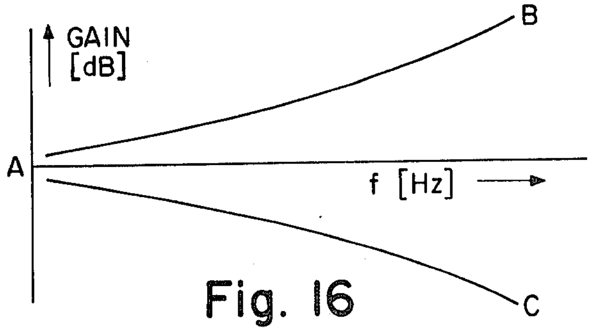
FIG. 16 illustrates typical magnitude characteristics utilizing the immittances illustrated in FIGS. 14 or 15.

FIG. 14 illustrates a typical RC shaping immittance Z($s$) or Y($s$) utilizing a plurality of lumped components which can be utilized in any of the embodiments illustrated above. A similar distributed RC shaping immittance is shown in FIG. 15. Incorporating these immittances in any one of the equalizer structures illustrated in FIGS. 2 through 13 will produce a monotonic frequency response as illustrated in FIG. 16, where:

$A$ = the attenuation through the equalizer at d-c;
$B$ = the gain through the equalizer relative to A; and
$C$ = the loss through the equalizer relative to A.

For the various circuit configurations:

$A = 0$ db, when $R = G = C = 0$ (FIGS. 8, 9, 10, 11, 12, 13)

$A = -6$ db, when $R = G = C = 0$ (FIGS. 2, 3, 4, 5)

$B = A + 20 \log |1 + 2R_o/Z(s)|$, when $R = -R_o$ (FIG. 12), $R = 0\ R_o$, $S$ in lower position (FIG. 13)

$C = A - 20 \log |1 + 2R_o/Z(s)|$, when $R = R_o$ (FIGS. 2, 3, 8, 11, 12) $R = R_o$, $S$ in upper position (FIG. 13)

$C = A = 20 \log |1 + 2G_o/Y(s)|$, when $G = G_o$ (FIGS. 4, 10)

Figure 5:
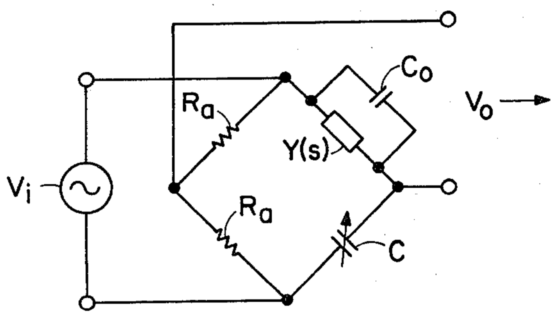

$C = A - 20 \log |1 + s2C_o/Y(s)|$, when $C = C_o$ (FIGS. 5, 9)

Typical non-limiting element values of the variable attenuation equalizer illustrated in FIG. 12 are as follows:

$R_a = R_o = 7.5\ k\Omega$
$R_b = 2.5\ k\Omega$
$R_1 = 3.56\ k\Omega$
$C_1 = 12.5\ \eta F$
$R_p = 0 - 15\ k\Omega$

What is claimed is:

1. An adjustable attenuation equalizer comprising:
a pair of input terminals for connecting an input signal voltage $V_i$ thereto;
a pair of output terminals for connecting an output signal voltage $V_o$ therefrom;
a plurality of fixed impedances including a pair of equal impedances $Z_a(s)$, a complex frequency variable impedance $Z(s)$ which is a function of complex frequency variable ($s$), and a reference impedance $Z_o(s)$; and
a variable impedance $Z_v(s)$;
the impedances being connected in a bridge configuration with the input terminals connected to one pair of diagonally opposite corners, and the output terminals connected to the other pair of diagonally opposite corners, of the arms of the bridge, the equal impedances $Z_a(s)$ being connected between the pair of the input terminals in two adjacent arms, the complex frequency variable impedance $Z(s)$ and the reference impedance $Z_o(s)$ being serially connected in a third arm, and the variable impedance $Z_v(s)$ in a fourth arm; and in accordance with the relationship:

$$T(s) = \frac{1 - (y)H(s)}{1 + (y)H(s)}$$

where
$T(s)$ = the transfer function of the equalizer,
$(y) = Z_v(s)/Z_o(s)$,
$H(s) = 1/(1 + Z(s)/Z_o(s))$, and
$-Z_o(s) \leqq Z_v(s) \leqq Z_o(s)$.

2. An adjustable attenuation equalizer as defined in claim 1 in which:
the pair of equal impedances $Z_a(s)$ are equal resistances $R_a$;
the reference impedances $Z_o(s)$ is a reference resistance $R_o$; and
the variable impedance $Z_v(s)$ is a variable resistance R.

3. An adjustable attenutation equalizer comprising:
a pair of input terminals for connecting an input signal thereto;
a pair of output terminals for connecting an output signal therefrom;
a plurality of fixed immittances including a pair of equal immittances $Z_a(s)$, a complex frequency variable immittance $Z(s)$ which is a function of a complex frequency variable ($s$), and a reference immittance $Z_o(s)$; and
a variable immittance $Z_v(s)$;
the immittances being connected in a bridge configuration with the input terminals connected to one pair of diagonally opposite corners, and the output terminals connected to the other pair of diagonally opposite corners, of the arms of the bridge, the equal immittances $Z_a(s)$ being connected between the pair of input terminals in two adjacent arms, the complex frequency variable immittance $Z(s)$ and the reference immittance $Z_o(s)$ being connected in a third arm, and the variable immittance $Z_v(s)$ in a fourth arm; and in accordance with the relationship:

$$T(s) = \frac{1-(y)H(s)}{1+(y)H(s)}$$

where:

$T(s)$ = the transfer function of the equalizer,
$(y) = Z_v(s)/Z_o(s)$,
$H(s) = 1/(1 + Z(s)/Z_o(s))$, and
$-Z_o(s) \leqq Z_v(s) \leqq Z_o(s)$.

4. An adjustable attenuation equalizer comprising:
a pair of input terminals for connecting an input signal voltage $V_i$ thereto;
a pair of output terminals for connecting an output signal voltage $V_o$ therefrom;
a pair of equal impedances $Z_a(s)$;
a plurality of fixed admittances including a complex frequency variable admittance $Y(s)$ which is a function of a complex frequency variable $(s)$, and a reference admittance $Y_o(s)$; and
a variable admittance $Y_v(s)$;
the impedances and admittances in a bridge configuration with the input terminals connected to one pair of diagonally opposite corners, and the output terminals connected to the other pair of diagonally opposite corners, of the arms of the bridge, the equal impedances $Z_a(s)$ being connected between the pair of input terminals in the two adjacent arms, the complex frequency variable admittance $Y(s)$ and the reference admittance $Y_o(s)$ being in shunt in a third arm, and the variable admittance $Y_v(s)$ in a fourth arm; and in accordance with the relationship:

$$T(s) = \frac{1-(y)H(s)}{1+(y)H(s)}$$

where:

$T(s)$ = the transfer function of the equalizer,
$(y) = Y_v(s)/Y_o(s)$,
$H(s) = 1/(1 + Y(s)/Y_o(s))$, and
$-Y_o(s) \leqq Y_v(s) \leqq Y_o(s)$.

5. An adjustable attenuation equalizer as defined in claim 4 in which:
the pair of equal impedances $Z_a(s)$ are equal resistances $R_a$;
the reference admittance $Y_o(s)$ is a reference conductance $G_o$; and
the variable admittance $Y_v(s)$ is a variable conductance G.

6. An adjustable attenuation equalizer comprising:
an input terminal for connecting an input signal voltage $V_i$ thereto;
an output terminal for connecting an output signal voltage $V_o$ therefrom;
a common terminal;

an operational amplifier having its output connected to said output terminal;
a variable reistance R; and
a plurality of fixed impedances, including a pair of equal resistances $R_a$, a complex frequency variable impedance $Z(s)$ which is a function of a complex frequency variable $(s)$, and a reference resistance $R_o$;
the pair of equal resistances $R_a$ being connected in series between the input and output terminals with the junction of said pair being connected to the inverting input of the opertional amplifier;
means for connecting the reference resistance $R_o$ and the complex frequency variable impedance $Z(s)$ between the input terminal and the non-inverting input of the operational amplifier; and
the variable resistance R being connected between said non-inverting input and the common terminal; in accordance with the relationship:

$$T(s) = \frac{1-(y)H(s)}{1+(y)H(s)}$$

where:

$T(s)$ = the transfer function of the equalizer,
$(y) = R/R_o$,
$H(s) = 1/(1 + Z(s)/(R_o)$, and
$-R_o \leqq R \leqq R_o$.

7. An adjustable attenuation equalizer as defined in claim 6 in which said connecting means includes a switch for alternately connecting the serially connected reference resistance $R_o$ and the complex frequency variable impedance $Z(s)$ between said non-inverting input and said output of the operational amplifier.

8. An adjustable attenuation equalizer as defined in claim 6 in which the variable resistance R is a positive resistance such that: $0 \leqq R \leqq R_o$.

9. An adjustable attenuation equalizer comprising:
an input terminal for connecting an input signal current $I_i$ thereto;
an output terminal for connecting an output signal current $I_o$ therefrom;
a common terminal;
a transistor having its collector connected to said output terminal;
a pair of admittance networks each including a fixed reference conductance $G_o$ in shunt with a complex frequency variable admittance $Y(s)$, one of the pair of admittance networks being connected between the input terminal and the common terminal, and the other of the pair being connected between the emitter of the transistor and the common terminal; and
a variable conductance G connected between the input and output terminals; in accordance with the relationship:

$$T(s) = \frac{1-(y)H(s)}{1+(y)H(s)}$$

where $T(s)$ = the transfer function of the equalizer,
$(y) = G/G_o$,
$H(s) = 1/(1 + Y(s)/(G_o)$, and
$-G_o \leqq G \leqq G_o$.

* * * * *

UNITED STATES PATENT AND TRADEMARK OFFICE

CERTIFICATE OF CORRECTION

PATENT NO. : 3,921,105

DATED : November 18, 1975

INVENTOR(S) : Franc BRGELZ, Kanata, Canada

It is certified that error appears in the above-identified patent and that said Letters Patent are hereby corrected as shown below:

Inventor's name should be: Franc BRGLEZ

Signed and Sealed this

*Twenty-sixth* Day of *December 1978*

[SEAL]

*Attest:*

RUTH C. MASON
*Attesting Officer*

DONALD W. BANNER
*Commissioner of Patents and Trademarks*